US005688909A

United States Patent [19]
Drent et al.

[11] Patent Number: 5,688,909
[45] Date of Patent: Nov. 18, 1997

[54] CATALYST COMPOSITION AND PROCESS FOR THE PREPARATION OF COPOLYMERS OF CARBON MONOXIDE AND AN OLEFINICALLY UNSATURATED COMPOUND

[75] Inventors: Eit Drent; Mirjam Catharina Theodora De Kock, both of Amsterdam, Netherlands

[73] Assignee: Shell Oil Company, Houston, Tex.

[21] Appl. No.: 660,559

[22] Filed: Jun. 12, 1996

[30] Foreign Application Priority Data

Jun. 12, 1995 [EP] European Pat. Off. ............ 95201553

[51] Int. Cl.[6] .................................................. C08G 67/02
[52] U.S. Cl. .................. 528/392; 528/392; 524/706; 524/773; 524/779; 524/785
[58] Field of Search ............... 528/392; 524/706, 524/773, 779, 785

[56] References Cited

U.S. PATENT DOCUMENTS

| | | |
|---|---|---|
| 3,979,374 | 9/1976 | Kiovsky et al. .................. 526/12 |
| 4,835,250 | 5/1989 | Drent . |
| 5,010,170 | 4/1991 | Rosenbrand et al. ............ 528/392 |

FOREIGN PATENT DOCUMENTS

| | | |
|---|---|---|
| 0235865 A2 | 9/1987 | European Pat. Off. . |
| 0246674 A2 | 11/1987 | European Pat. Off. . |
| 0614928 A2 | 9/1994 | European Pat. Off. . |
| 673656 A5 | 3/1990 | Liechtenstein . |

*Primary Examiner*—Samuel A. Acquah

[57] ABSTRACT

A catalyst composition which is based upon
(a) a source of nickel cations, and
(b) a bidentate ligand of the general formula $R^1R^2M^1$—$R$—$M^2R^3R^4$(I) wherein $M^1$ and $M^2$ represent independently phosphorus, nitrogen, arsenic or antimony, $R^1$, $R^2$, $R^3$ and $R^4$ represent independently optionally polar substituted hydrocarbyl groups on the understanding that at least one of $R^1$, $R^2$, $R^3$ and $R^4$ represent a substituted aryl group, and R represents a bivalent bridging group of which the bridge consists of at most two bridging atoms, and a process for the preparation of copolymers of carbon monoxide and an olefinically unsaturated compound comprising ontacting the monomers in the presence of the said catalyst composition.

11 Claims, No Drawings

CATALYST COMPOSITION AND PROCESS FOR THE PREPARATION OF COPOLYMERS OF CARBON MONOXIDE AND AN OLEFINICALLY UNSATURATED COMPOUND

FIELD

The invention relates to a catalyst composition and a process for the preparation of copolymers of carbon monoxide and one or more olefinically unsaturated compounds.

BACKGROUND OF THE INVENTION

Linear copolymers of carbon monoxide with one or more olefinically unsaturated compounds can be prepared by contacting the monomers in the presence of a Group VIII metal containing catalyst. The copolymers can be processed by means of conventional techniques into films, sheets, plates, fibres and shaped articles for domestic use and for parts in the car industry. They are useful in many outlets for thermoplastics. The units originating from carbon monoxide on and the units originating from the olefinically unsaturated compound(s) occur in an alternating or substantially alternating arrangement.

The preparation of the copolymers with catalysts based on palladium as the Group VIII metal has been studied extensively because palladium based catalysts provide a high polymerization rate. However, a disadvantage of using palladium based catalysts is the high palladium price. Methods for the extraction of palladium remnants from the copolymers which allow the recycle of palladium are available, but these methods introduce additional process steps which complicates the total polymerization process scheme. Another disadvantage is that palladium based catalysts have a tendency to plate-out, i.e. to convert into the zero-valent metallic state. Plating-out during the copolymer work-up and further processing may cause some grey discoloration of the copolymer particularly when the content of catalyst remnants is high. Plating-out may also occur during the catalyst preparation or the storage of the catalyst composition prior to its use in the copolymerization process. The tendency to plate-out is associated with the noble-metal character of palladium. It would be desirable to find an alternative to palladium based catalysts.

Nickel and cobalt are other Group VIII metals which can be used in the copolymerization of carbon monoxide with olefinically unsaturated compounds. For example, U.S. Pat. No. 3,984,388 disclosed the use of nickel cyanide based catalysts. These catalysts, however, displayed a low polymerization activity despite the application of a high polymerization temperature. An improvement in the polymerization rate was accomplished in EP-A-121965 which teaches the use of catalysts containing nickel or cobalt complexed with a bidentate ligand which is 1,3-bis(diphenylphosphino)propane or 1,4-bis(diphenylphosphino) butane. However, the molecular weight of the copolymers so produced was lower than desirable in many applications. Moreover, the polymerization rates obtained still leave substantial room for further improvements.

EP-A-470759 disclosed the use of catalysts based on nickel complexed with a mercaptocarboxylic acid. The working examples in that application reveal that the polymerization rates achieved were again low. Thus far only unsatisfactory or marginal results have been obtained with nickel or cobalt based catalysts.

It has now been found that substantial improvements in the performance of nickel containing catalysts can be achieved by using therein nickel complexed with a modified bidentate ligand. The modification involves the presence of a chelating atom carrying a substituted aromatic group and a small bridging group connecting two chelating atoms. The improvements reside in the polymerization rate, as well as in the molecular weight achievable. Consequences of this finding are that in a simple and efficient manner copolymers can be prepared using a non-plating metal and that the copolymers thus prepared can have a very low content of catalyst remnants. Such copolymers have a good melt stability. The use of the nickel based catalyst surprisingly leads to a copolymer with a higher molecular weight than when a similar palladium based catalyst is used under otherwise identical conditions.

SUMMARY OF THE INVENTION

The invention relates to a catalyst composition comprising
 (a) a source of nickel cations, and
 b) a bidentate ligand of the general formula $R^1R^2M^1$—R—$M^2R^3R^4$ (I) wherein $M^1$ and $M^2$ represent independently phosphorus, nitrogen, arsenic or antimony, $R^1$, $R^2$, $R^3$ and $R^4$ represent independently optionally polar substituted hydrocarbyl groups on the understanding that at least one of $R^1$, $R^2$, $R^3$ and $R^4$ represent a substituted aryl group, and R represents a bivalent bridging group of which the bridge consists of at most two bridging atoms.

The invention also relates to a process for the preparation of copolymers of carbon monoxide and an olefinically unsaturated compound comprising contacting the monomers in the presence of a catalyst composition according to this invention.

In addition the invention relates to a linear copolymer of carbon monoxide and an olefinically unsaturated compound which copolymer comprises nickel in a quantity of up to 500 ppmw relative to the weight of the copolymer and which copolymer is free or substantially free of palladium.

DETAILED DESCRIPTION

As the source of nickel cations conveniently a nickel salt, such as a nickel (II) salt, is used. Suitable salts include salts of mineral acids such as sulphuric acid, nitric acid, phosphoric acid and sulphonic acids, and organic salts, such as nickel acetylacetonate. Preferably, a nickel salt of a carboxylic acid is used, for example a carboxylic acid with up to 8 carbon atoms, such as acetic acid, trifluoroacetic acid, trichloroacetic acid, propionic acid and citric acid. Nickel (II) acetate represents a particularly preferred source of nickel cations. Another very suitable source of nickel cations is a compound of nickel in its zero-valent state, i.e. nickel (0), complexed with an organic ligand, such as a diene or a phosphine. Examples of such complexes are nickel (0) tetracarbonyl, nickel (0) bis(triphenylphosphine) dicarbonyl and nickel (0) dicyclooctadiene, from which cationic species may be formed by reaction, e.g., with a strong acid, such as trifluoroacetic acid.

In the ligands of formula (I) $M^1$ and $M^2$ preferably represent phosphorus atoms. $R^1$, $R^2$, $R^3$ and $R^4$ may independently represent optionally polar substituted alkyl, aryl, alkaryl, aralkyl or cycloalkyl groups having typically up to 20 carbon atoms, more typically up to 10 carbon atoms, on the understanding that at least one of $R^1$, $R^2$, $R^3$ and $R^4$ represents a substituted aryl group. Such a substituted aryl group has preferably up to 20 carbon atoms, more preferably up to 10 carbon atoms. Typically at least one of $R^1$ and $R^2$ and at least one of $R^3$ and $R^4$ represent a substituted aryl group, more typically each of $R^1$, $R^2$, $R^3$ and $R^4$ represent a substituted aryl group.

Suitable substituents present at the substituted aryl group(s) are alkyl groups, such as methyl, ethyl or t-butyl groups. However, it is preferred that the substituted aryl groups are polar substituted. Suitable polar substituents include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups. The preferred polar substituent is an alkoxy group, especially a methoxy group.

It is preferred that substituted aryl groups $R^1$, $R^2$, $R^3$ and $R^4$ are phenyl groups having a substituent typically at an ortho position with respect to $M^1$ or $M^2$. Further substituents are preferably positioned in an ortho position, as well, or in a para position with respect to $M^1$ or $M^2$.

The bridging group R of the ligands of formula (I) is typically an organic bridging group having up to 10 carbon atoms. The bridging atoms are preferably carbon atoms, but it is also feasible that one or two bridging atoms are heteroatoms, such as silicon or oxygen atoms. Preferably there are two bridging carbon atoms. The bridging group R may be aliphatic, olefinic or aromatic in nature. However, it is preferably a 1,2-alkylene group, for example a 1,2-propylene, a 2,3-butylene group or a 1,2-cyclohexylene group. R represents most preferably an ethylene group (—$CH_2$—$CH_2$—).

Preferred bidentate ligands are 1,2-bis[(2-methoxyphenyl),phenylphosphino]-ethane, 1,2-bis[bis(2,4-dimethoxyphenyl)phosphino]ethane, 1,2-bis[bis(2,4,6-trimethoxyphenyl)phosphino]ethane and, most preferred, 1,2-bis[bis(2-methoxyphenyphenyl)phosphino]ethane.

The amount of bidentate ligand supplied to the catalyst composition may vary, but is conveniently selected in the range of from 0.1 to 2 moles of bidentate ligand per gram atom of nickel. Preferably, the amount is in the range of from 0.5 to 1.5 moles of ligand per gram atom of nickel.

The catalyst composition may be based on an additional component which functions during the copolymerization as a source of anions which are non- or only weakly co-ordinating with nickel. Typical additional components are, for example, protic acids, salts of protic acids, Lewis acids, combinations of Lewis acids and protic acids, and salts derivable from such combinations. Suitable are strong protic acids and their salts, which strong protic acids have in particular a pKa of less than 6, more in particular less than 4, preferably less than 2, when measured in aqueous solution at 18 C. Examples of suitable protic acids are the above mentioned acids which may also participate in the nickel salts, e.g. trifluoroacetic acid. Other suitable protic acids are adducts of boric acid and 1,2-diols, catechols or salicylic acids. Salts of these acids may be used as well. Other suitable salts contain one or more hydrocarbylborate anions or carborate anions, such as sodium tetrakis[bis-3,5-(trifluoromethyl)phenyl]-borate, lithium tetrakis (perfluorophenyl)borate and cobalt carborate ($Co(B_{11}CH_{12})_2$). Suitable Lewis acids are, for example, $BF_3$, $SnCl_2$, $SnF_2$ and $Sn(CF_3SO_3)_2$, and hydrocarbylboranes, such as triphenylborane, tris(perfluorophenyl)borane and tris[bis-3,5-(trifluoromethyl)phenyl]borane. Protic acids with which Lewis acids may be combined are for example sulphonic acids and hydrohalogenic acids, in particular HF. A very suitable combination of a Lewis acid with a protic acid is tetrafluoroboric acid ($HBF_4$). Other compounds which may be mentioned in this context are aluminoxanes, in particular methyl aluminoxanes and t-butyl aluminoxanes.

The amount of the additional component is preferably selected in the range of from 0.1 to 50 moles per gram atom of nickel, in particular in the range of from 0.5 to 25 moles. However, the aluminoxanes may be used in such a quantity that the molar ratio of aluminium to nickel is in the range of from 4000:1 to 10:1, preferably from 2000:1 to 100:1.

The activity of the catalyst composition is such, that amounts in the range from $10^{-7}$ to $10^{-2}$ gram atom of nickel per mole of olefinically unsaturated compound to be copolymerized, are adequate. Preferably, the amount will be from $10^{-6}$ to $10^{-3}$, on the same basis.

Olefinically unsaturated compounds which can be used as monomers in the copolymerization process of the invention, include compounds consisting exclusively of carbon and hydrogen and compounds which in addition comprise hetero atoms, such as unsaturated esters. Unsaturated hydrocarbons are preferred. Examples of suitable monomers are lower olefins, i.e. olefins containing from 2 to 6 carbon atoms, such as ethene, propene and butene-1, cyclic olefins such as cyclopentene, aromatic compounds, such as styrene and alpha-methylstyrene and vinyl esters, such as vinyl acetate and vinyl propionate. Preference is given to ethene and mixtures of ethene with another a-olefin, such as propene or butene-1. Generally, the molar ratio of carbon monoxide to the olefinically unsaturated compound(s) may be selected within a wide range, for example in the range of from 1:50 to 20:1 respectively. However, it is preferred to employ a molar ratio in the range of from 1:20 to 2:1.

The process of the invention is conveniently carried out in the presence of a diluent. Preferably a diluent is used in which the copolymers are insoluble or virtually insoluble so that they form a suspension upon their formation. Recommended diluents are polar organic liquids, such as ketones, ethers, esters or amides. Preferably, protic liquids are used, such as monohydric and dihydric alcohols, in particular the lower alcohols having at most 4 carbon atoms per molecule, such as methanol and ethanol. The process of this invention may also be carried out as a gas phase process, in which case the catalyst is typically used deposited on a solid particulate material or chemically bound thereto.

When a diluent is used in which the formed copolymer forms a suspension it is preferred to have a solid particulate material suspended in the diluent before the monomers are contacted with the catalyst composition. Suitable solid particulate materials are silica, polyethene and a copolymer of carbon monoxide and an olefinically unsaturated compound, preferably a copolymer which is based on the same monomers as the copolymer to be prepared. The quantity of the solid particulate material is preferably in the range of from 0.1 to 20 g, particularly from 0.5 to 10 g per 100 g diluent.

The conditions under which the process of the invention is performed, include the use of elevated temperatures and pressures, such as between 20° and 200° C., in particular between 30° and 130° C., and between 1 and 200 bar, in particular between 5 and 100 bar.

The copolymers can be recovered from the polymerization mixture by using conventional techniques. When a diluent is used the copolymers may be recovered by filtration or by evaporation of the diluent. The copolymer may be purified to some extend by washing.

Copolymers are suitably prepared in which the units originating from carbon monoxide and the units originating from the olefinically unsaturated compound(s) occur in an alternating or substantially alternating arrangement. The term "substantially alternating" will generally be understood by the person skilled in the art as meaning that the molar ratio of the units originating from carbon monoxide to the units originating from the olefinically unsaturated compound(s) is above 35:65, preferably above 40:60. When the copolymers are alternating this ratio equals 50:50.

A high Limiting Viscosity Number (LVN), or intrinsic viscosity, of the copolymers LVN is indicative of a high molecular weight. In the context of this document the LVN is calculated from determined viscosity values, measured for different copolymer concentrations in m-cresol at 60° C. It is preferred to prepare copolymers having in LVN in the range of from 0.2 to 10 dl/g, in particular from 0.4 to 8 dl/g, more in particular from 0.6 to 6 dl/g. It is also preferred to prepare copolymers which have a melting point above 150° C., as determined by Differential Scanning Calorimetry (DSC). For example, linear copolymers of carbon monoxide and ethene and linear copolymers of carbon monoxide, ethene and another a-olefin which are alternating or substantially alternating fall into this category. It is particularly preferred to prepare linear alternating copolymers of carbon monoxide and ethene or linear alternating copolymers of carbon monoxide, ethene and another a-olefin in which the molar ratio of the other a-olefin to ethene is typically above 1:100, preferably in the range of from 1:100 to 1:3, more preferably in the range of from 1:50 to 1:5.

The nickel content of the copolymers will typically be above 0.01 ppmw, relative to the weight of the copolymer. It is preferred to prepare copolymers which have a nickel content in the range of from 0.05 to 300 ppmw, in particular from 0.1 to 200 ppmw, relative to the weight of the copolymer. The copolymers are substantially free of palladium. "Substantially free" means that the palladium content is lower than the value normally achieved when a palladium based catalyst is employed in the copolymerization, for example less than 1 ppmw, in particular less than 0.1 ppmw, relative to the weight of the copolymer. Alternatively it is preferred that, if palladium is present, the weight ratio of palladium to nickel is less than 1:50, in particular less than 1:100 or most in particular even less than 1:200.

The invention is illustrated by the following examples of the preparation of linear alternating carbon monoxide/olefin copolymers.

EXAMPLE 1

A carbon monoxide/ethene copolymer was prepared as follows. A stirred 200 ml autoclave was charged with a catalyst solution having 100 ml of methanol, 0.25 mmol of nickel (II) acetate, 1 mmol of trifluoroacetic acid, and 0.3 mmol of 1,2-bis[bis(2-methoxyphenyl)phosphino]ethane. The air in the autoclave was removed by evacuation. The autoclave was then pressurized with ethene to 20 bar and additionally with 30 bar carbon monoxide, i.e. a total of ethene and carbon monoxide of 50 bar. Subsequently the autoclave was heated to 90 C. After 5 hours the polymerization was terminated by cooling to ambient temperature and subsequently releasing the pressure. The copolymer was recovered by filtration, washing with methanol and drying at 60° C. in nitrogen at a reduced pressure.

The yield was 13.5 g of a water-white copolymer having an LVN of 1.67 dl/g, which corresponds with a number average molecular weight of about 25000.

EXAMPLE 2 (COMPARATIVE)

A carbon monoxide/ethene copolymer was prepared as described in Example 1, except that 0.3 mmol of 1,3-bis[bis(2-methoxyphenyl)phosphino]propane was used instead of 1,2-bis[bis(2-methoxyphenyl)phosphino]ethane and that the polymerization time was 10 hours instead of 5 hours.

The yield was 0.7 g of a yellowish white copolymer.

EXAMPLE 3 (COMPARATIVE)

A carbon monoxide/ethene copolymer was prepared as described in Example 1 except that 0.3 mmol of 1,2-bis(diphenylphosphino)ethane was used instead of 1,2-bis[bis(2-methoxyphenyl)phosphino]ethane and that the polymerization time was 10 hours instead of 5 hours.

The yield was 0.6 g of a yellowish white copolymer.

EXAMPLE 4 (COMPARATIVE)

A carbon monoxide/ethene copolymer was prepared as described in Example 1 except that 0.3 mmol of 1,3-bis(diphenylphosphino)propane was used instead of 1,2-bis[bis(2-methoxyphenyl)phosphino]ethane and that the polymerization time was 3 hours instead of 5 hours.

The yield was 0.1 g of a yellowish white copolymer.

EXAMPLE 5 (COMPARATIVE)

When a carbon monoxide/ethene copolymer is prepared as described in Example 1 except that 0.25 mmol of palladium (II) acetate is used instead of nickel (II) acetate, a greyish copolymer is obtained which has an LVN of approximately 1 dl/g or less.

EXAMPLE 6

A carbon monoxide/ethene copolymer was prepared as described in Example 1, except that (1) the catalyst solution comprised 100 ml of methanol, 0.1 mmol of nickel (II) acetate, 0.2 mmol of tetrafluoroboric acid, and 0.12 mmol of 1,2-bis[bis(2-methoxyphenyl)phosphino]ethane, (2) the temperature was 100° C. instead of 90° C., and (3) the polymerization time was 3 hours instead of 5 hours.

The yield was 8 g of a water-white copolymer having an LVN of 1.64 dl/g.

EXAMPLE 7

A carbon monoxide/ethene copolymer was prepared as described in Example 1, except that (1) the catalyst solution comprised 100 ml of methanol, 0.1 mmol of nickel (II) acetate, 0.2 mmol of trifluoroacetic acid, and 0.12 mmol of 1,2-bis[bis(2-methoxyphenyl)phosphino]ethane, (2) the temperature was 100° C. instead of 90° C., (3) the ethene and the carbon monoxide were fed at 30 bar and 20 bar pressure instead of 20 bar and 30 bar, respectively, and (4) the polymerization time was 1 hour instead of 5 hours.

The yield was 4.5 g of a water-white copolymer having an LVN of 2.10 dl/g.

EXAMPLE 8 (COMPARATIVE)

A carbon monoxide/ethene copolymer was prepared as described in Example 7, except that the catalyst solution contained 0.1 mmol of cobalt (II) acetate instead of nickel (II) acetate and that the polymerization time was 3 hours instead of 1 hour.

The yield was 0.3 g of a yellowish white copolymer.

EXAMPLE 9

A carbon monoxide/ethene copolymer was prepared as described in Example 1, but except that (1) the catalyst solution comprised
  100 ml of methanol,
  0.02 mmol of nickel (II) acetate,
  0.04 mmol of trifluoroacetic acid, and
  0.024 mmol of 1,2-bis[bis(2-methoxyphenyl) phosphino]ethane, (2) the temperature was 100° C. instead of 90° C., (3) the ethene and the carbon monoxide were fed at 40 bar and 20 bar pressure instead of 20 bar and 30 bar, respectively, and (4) the polymerization time was 1.5 hour instead of 5 hours.

The yield was 6.0 g of a water-white copolymer having an LVN of 2.35 dl/g.

EXAMPLE 10

A carbon monoxide/ethene copolymer was prepared as described in Example 1, except that (1) the catalyst solution comprised
  100 ml of methanol,
  0.02 mmol of nickel (II) acetate,
  0.04 mmol of trifluoroacetic acid, and
  0.024 mmol of 1,2-bis[bis(2-methoxyphenyl) phosphino]ethane, (2) the temperature was 50° C. instead of 90° C., (3) the ethene and the carbon monoxide were fed at 30 bar and 10 bar pressure instead of 20 bar and 30 bar, respectively, and (4) the polymerization time was 0.12 hours instead of 5 hours.

The yield was 3.5 g of a water-white copolymer having an LVN of 5.95 dl/g.

We claim as our invention:

1. A catalyst composition consisting essentially of:

(a) a source of nickel cations, and (b) a bidentate ligand of the formula $R^1R^2M^1$—R—$M^2R^3R^4$ (I) wherein $M^1$ and $M^2$ represent independently phosphorus, nitrogen, arsenic or antimony, $R^1$, $R^2$, $R^3$ and $R^4$ represent independently optionally polar substituted hydrocarbyl groups; wherein at least one of $R^1$, $R^2$, $R^3$ and $R^4$ represent a polar substituted aryl group, and R represents a bivalent bridging group of which the bridge consists of two bridging atoms.

2. A catalyst composition as claimed in claim 1, wherein the source of nickel cations comprises a nickel salt or a compound of nickel (0) complexed with an organic ligand.

3. A catalyst composition as claimed in claim 1 wherein $M^1$ and $M^2$ represent phosphorus atoms and at least one of $R^1$ and $R^2$ and at least one of $R^3$ and $R^4$ of the bidentate ligand of formula (I), is a polar substituted aryl group.

4. A catalyst composition as claimed in claim 3, wherein the polar substituted aryl group is a phenyl group substituted at an ortho position with respect to $M^1$ or $M^2$ with an alkoxy group.

5. A catalyst composition as claimed in claim 1 wherein the bivalent bridging group R is a 1,2-alkylene group.

6. A catalyst composition as claimed in claim 1 wherein the amount of the bidentate ligand of the general formula (I) is selected in the range of from 0.5 to 1.5 moles per gram atom of nickel.

7. A catalyst composition as claimed in claim 1 further comprising a component selected from the group consisting of protic acids, salts of protic acids, Lewis acids, combinations of Lewis acids and protic acids, salts derivable from such combinations, salts which contain a hydrocarbylborate anion or a carborate anion, and aluminoxanes.

8. A catalyst composition as claimed in claim 7, wherein the amount of the additional component is selected in the range of from 0.1 to 50 moles per gram atom of nickel with the proviso that if an aluminoxane is used, the amount of aluminoxanes is selected such that the molar ratio of aluminum to nickel is in the range of from 4000:1 to 10:1.

9. A process for the preparation of copolymers of carbon monoxide and an olefinically unsaturated compound comprising contacting the monomers in the presence of a catalyst composition as claimed in claim 1.

10. A process as claimed in claim 9 wherein the olefinically unsaturated compound is an unsaturated hydrocarbon.

11. A process as claimed in claim 9 wherein said contacting step is carried out in a diluent in which the copolymers are insoluble or virtually insoluble; wherein said catalyst composition comprises nickel quantities between about $10^{-7}$ to $10^{-2}$ gram atom per mole of olefinically unsaturated compound to be copolymerized, and the molar ratio of carbon monoxide to the olefinically unsaturated compound (s) is between about 1:50 and 20:1, the temperature is between about 20° and 200° C. and the pressure between 1 and 200 bar.

* * * * *